United States Patent [19]

Botsch

[11] Patent Number: 4,921,599

[45] Date of Patent: May 1, 1990

[54] DOUBLE-RACK GRATING FOR USE IN WASTEWATER

[75] Inventor: Bertram Botsch, Karlsruhe, Fed. Rep. of Germany

[73] Assignee: Maschinenfabrik Hellmut Geiger GmbH. & Co. KG, Karlruhe, Fed. Rep. of Germany

[21] Appl. No.: 190,820

[22] Filed: May 6, 1988

[30] Foreign Application Priority Data

May 6, 1987 [DE] Fed. Rep. of Germany ....... 3715020

[51] Int. Cl.$^5$ .............................................. B01D 39/10
[52] U.S. Cl. .................................. 210/155; 210/499; 210/498
[58] Field of Search ................ 210/498, 499, 155, 159

[56] References Cited

U.S. PATENT DOCUMENTS

| | | | |
|---|---|---|---|
| 1,717,313 | 6/1929 | D'Olier | 210/499 |
| 2,271,662 | 2/1942 | Rubissow | 210/499 |
| 3,037,630 | 1/1959 | Bixby | 210/499 |
| 3,169,111 | 2/1965 | Rose et al. | 210/499 |
| 3,716,144 | 2/1973 | Bartlow | 210/499 |
| 3,934,521 | 1/1976 | Andreoli | 110/226 |
| 4,184,957 | 1/1980 | Botsch | 210/159 |

FOREIGN PATENT DOCUMENTS 513638 9/1952 Belgium ............................. 210/499

*Primary Examiner*—Richard V. Fisher
*Assistant Examiner*—Cynthia L. Nessler
*Attorney, Agent, or Firm*—Wenderoth, Lind & Ponack

[57] ABSTRACT

A double screen or double-rack grate for use in the extra-fine screening of waste waters includes two rows of rods in laterally staggered arrangements with one row positioned behind the other in the direction of flow of waste water to be screened. Each rod of one row has a hydrodynamic cross section defined by a thickened head portion. Such row of rods is positioned downstream of a first row of rods including rods with substantially rotationally symmetrical cross sections.

8 Claims, 1 Drawing Sheet

DOUBLE-RACK GRATING FOR USE IN WASTEWATER

BACKGROUND OF THE INVENTION

The present invention relates to a double screen or double-rack grate for use in the extra-fine screening of waste waters, and including two rows of rods. A first row of rods is positioned upstream of a second row of rods, relative to a direction of flow of waste water to be screened and the rods of the second row are staggered relative to the rods of the first row, laterally of the direction of flow.

Double screens and double-rack grates having properly aligned rods and rows of rods in staggered arrangement are known. Extra-fine screens or grates refer to screens or grates with a clearance between adjacent rods of less than 10 mm, preferably less than 8 mm. This type of extra-fine screen or grate is reliable in operation for the retention of granular or similar matter. However, when used with waste water and sewage flows carrying fibrous substances, serious failures will result due to clogging deposits of fibers encircling the surfaces of the rods. Once such clogging and flow obstruction have taken place by accumulation, these undesired surface coverings keep increasing during operation and in the end can no longer be removed by appropriate cleaning agents. The breakdown or failure of such a screen or grate due to clogging finally can be overcome only by exchanging it with a new screen or grate and scrapping the old one.

Obviously, complicated processes of flow between the rods play an important role in the formation of such cloggings that accumulate on the surfaces of the rods. It has been found that, even though staggered rectangular sections enable the setting of very narrow clearance widths, such arrangements are extremely vulnerable to the dirt conditions mentioned above.

SUMMARY OF THE INVENTION

The object of the present invention is to provide an extra-fine screen or grate of the type described above, but which may be kept free from clogging when used in the screening of fiber-containing waters, particularly waste waters.

This object is achieved according to the invention by the provision that each rod of the second row of rods has a hydrodynamic profile or cross section and that each rod of the first row of rods has a substantially rotationally symmetrical cross section.

The term "substantially rotationally symmetrical cross section" means that not only circular cross-sectional shapes, but also polygonal, particularly tetragonal, cross sections and slightly elliptical cross sections, are included. The change in cross section or the change in the radius vector from the center to the boundary contour should preferably not exceed the ratio 1:2 (the case of the square).

Such a combination of cross-sectional shapes in the staggered rows of rods resists the concentration of pollutants and the twisting of bunches of fibers by virtue of the formation of hydrodynamic flow conditions.

Advantageously, the distance between the two rows of rods can be chosen such that the cross-sectional area of the rods of the first row of rods at least contacts or even intersects a line connecting the front-side contour or upstream ends of the rods of the second row of rods.

In one advantageous embodiment, the rods of the first row of rods have circular cross sections. In another, like advantageous, preferred embodiment, the rods of the first row of rods have square cross sections with each rod having two planar surfaces extending substantially parallel to the direction of flow A preferred embodiment provides that, while the rods of the first row of rods have circular or square cross sections, each rod of the second row of rods has a symmetrical cross-sectional shape, in the direction of flow, defined by a rectangular web portion connected to a downstream end of a generally quadrangular head portion that tapers in a converging manner in the direction of flow. When any of the rods have edges, then such edges advantageously are rounded.

Furthermore, to fasten the rods of the first and/or second row of rods, it may be of hydrodynamic advantage to connect the rods, preferably via web portions, outside the area or zone of clearance between the rods, i.e. downstream of the rods, with transverse retaining members which are held in suitable wall-side retaining elements of a flow passage or the like within which the double screen of the invention is mounted.

By the features of the present invention it is possible to provide an extra-fine screen or grate that, due to the limited deposit of dirt particles, particularly of fibers, has a long service life with a substantially undiminished area of section of passage therethrough. Such extra-fine screen or grate is also very hydrodynamic and exhibits a low loss of flow.

BRIEF DESCRIPTION OF THE DRAWINGS

The invention will now be described with reference to one embodiment thereof and with reference to the accompanying drawings, wherein.

DETAILED DESCRIPTION OF THE INVENTION

Figure 1:
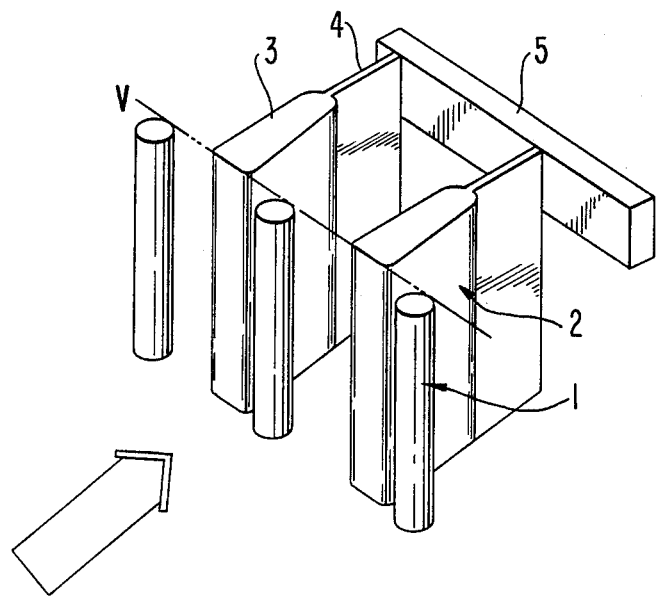
FIG. 1 is a perspective view of one embodiment of a double screen or double-rack grate according to the invention.

The drawings show a double-rack grating or double screen formed by a first row of rods 1 each having a circular cross section and a second row of rods 2 each having hydrodynamic cross section. The cross sections of the rods of the second row of rods each is formed by a head portion 3 tapering or converging in the direction of flow and connected to a web portion 4 that is rectangular in section. The web portions 4 of the second row of rods are connected by transverse retaining profile members 5 positioned downstream of the rods. The rods of the first row of rods can be connected or fastened in like manner by having web portions 4' extending between adjacent web portions 4.

The first row of rods 1 with a circular cross section of the rods is arranged in such a way that each such rod intersects a line V connecting the upstream ends or edges of the head portions 3 in the second row of rods 2.

Figure 2:
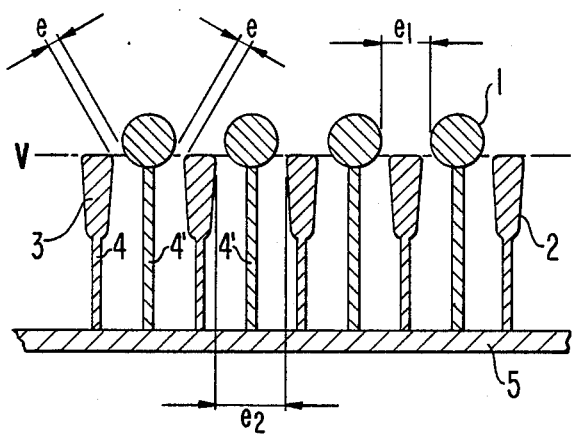
FIG. 2 is a horizontal section thereof.

The geometric relationships among the rods is shown in FIG. 2 and is such that a clearance e is provided between each rod 1 and adjacent head portion 3, a clearance $e_1$ is provided between adjacent rods 1, and a clearance $e_2$ is provided between adjacent head portions 3.

I claim:

1. A double screen device for use in extra-fine screening of liquids, said device comprising:

first and second rows of rods respectively forming first and second screens, said second row of rods being positioned downstream of said first row of rods, with respect to a direction of flow of a liquid to be screened, said rods of said first and second rows being staggered laterally relative to said direction of flow;

each said rod of said first row having a substantially rotationally symmetrical transverse cross section;

each said rod of said second row including a thickened head portion having a hydrodynamic transverse cross section;

said rods of both said first and second rows having web portions connected to at least one transverse retaining member, said web portions of said rods of said first row of rods extending between said web portions of adjacent said rods of said second row of rods; and the spacing between said first and second rows being such that said rods of said first row at least control a common plane connecting the upstreammost edges of said rods of said second row, whereby said rods of said first and second rows define therebetween clearances effective for extra-fine screening.

2. A device as claimed in claim 1, wherein said rods of said first row intersect said common plane.

3. A device as claimed in claim 1, wherein each said rod of said first row has a circular transverse cross section.

4. A device as claimed in claim 1, wherein each said rod of said first row has a squaare cross section and two planar surfaces extending substantially parallel to said direction of flow.

5. A device as claimed in claim 14, wherein edges of said square rods of said first row are rounded.

6. A device as claimed in claim 1, wherein each said rod of said second row is symmetrical in said direction of flow and said a web portion thereof has a rectangular transverse cross section, said web portion being connected to a downstream end of said head portion and extending downstream thereof.

7. A device as claimed in claim 6, wherein said head portion is laterally thickened at the upstream end thereof and tapers in a converging manner toward said downstream end thereof.

8. A device as claimed in claim 1, wherein said at least one transverse retaining member is positioned downstream of said rods.

* * * * *